(12) United States Patent
Nagasaka

(10) Patent No.: US 6,616,187 B2
(45) Date of Patent: Sep. 9, 2003

(54) FUEL TANK UNIT OF MOTORCYCLE

(75) Inventor: Munenori Nagasaka, Inasa-Gun (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/994,699

(22) Filed: Nov. 28, 2001

(65) Prior Publication Data

US 2002/0063004 A1 May 30, 2002

(30) Foreign Application Priority Data

Nov. 29, 2000 (JP) ........................................ 2000-362616

(51) Int. Cl.⁷ ................................................ B60P 3/22
(52) U.S. Cl. .................. 280/835; 280/834; 137/565.34; 137/574
(58) Field of Search ................................. 280/835, 834; 180/69.4; 137/565.17, 565.34, 574; 123/509, 514

(56) References Cited

U.S. PATENT DOCUMENTS

| 4,178,004 | A | * | 12/1979 | Shinoda et al. | ............. | 280/834 |
|---|---|---|---|---|---|---|
| 4,449,723 | A | * | 5/1984 | Shiratsuchi | ................. | 280/833 |
| 5,040,516 | A | * | 8/1991 | Haraguchi | .................. | 123/509 |
| 5,542,706 | A | * | 8/1996 | Kubly | ........................ | 280/833 |
| 5,979,485 | A | * | 11/1999 | Tuckey et al. | .............. | 137/143 |
| 6,000,913 | A | * | 12/1999 | Chung et al. | ................. | 417/53 |
| 6,253,790 | B1 | * | 7/2001 | Hara | ..................... | 137/565.17 |
| 6,401,750 | B2 | * | 6/2002 | Tokunaga | .............. | 137/565.34 |
| 2001/0018932 | A1 | * | 9/2001 | Tokunaga | .............. | 137/565.34 |

* cited by examiner

Primary Examiner—Brian L. Johnson
Assistant Examiner—J. Allen Shriver
(74) Attorney, Agent, or Firm—Oblon, Spivak, McClelland, Maier & Neustadt, P.C.

(57) ABSTRACT

A fuel tank unit of a motorcycle, in which an air cleaner and a fuel tank unit are disposed above an engine, comprises a fuel tank body having a front half portion having a recess to receive the air cleaner therein and a rear half portion serving as a substantial capacity section of the fuel tank body, a fuel pump disposed inside the substantial capacity section, and a fuel level gauge device mounted on a top portion of the fuel pump to detect a fuel level in the fuel tank body. The fuel level gauge includes a gauge body and an arm member pivoted on a gauge body, and the arm member having a free end swingable above the fuel pump.

3 Claims, 3 Drawing Sheets

FUEL TANK UNIT OF MOTORCYCLE

BACKGROUND OF THE INVENTION

The present invention relates to a fuel tank unit of a motorcycle having an improved mounting structure.

There has been provided a motorcycle having a device for transmitting, when fuel received in a fuel tank is decreased to an amount of less than a prescribed amount, information to a rider accordingly.

With respect to such a device, as disclosed in Japanese Utility Model Publication No. S58-37746, an opening is formed on the bottom of the fuel tank and a float type fuel level gauge is inserted in the fuel tank through such opening. The fuel level gauge is integrally provided with a cover, which closes the opening.

With respect to the devices, for example, as disclosed in Japanese Patent Laid-Open Publication No. H1-257686, the fuel tank includes therein a fuel pump and the fuel pump is provided with a fuel sensor utilizing a thermistor, which operates by the utilization of a change in temperature of the thermistor depending on change in its resistance. The thermistor is mounted at a prescribed level in the fuel tank so as to detect, as resistance value, difference in temperature between one state where the thermistor is submerged in a liquid and another state where it exists in air. When fuel is decreased to an amount of a level less than the prescribed level, the thermistor gives information to a rider that the fuel is decreased to the amount less than the prescribed amount.

However, in the structure in which the fuel tank is provided with the float type fuel level gauge, provision of the fuel pump in the fuel tank requires formation of a specific opening for the fuel pump. A layout of the fuel tank makes it hard to secure a wide flat surface on which the opening is to be formed, on the bottom of the fuel tank. Especially, although a sufficient distance is required between the movable float and the fuel pump to prevent interference therebetween, it is difficult to secure a wide space thereto for the reasons mentioned above.

The fuel sensor utilizing the thermistor has advantage in the location of space. However, such a fuel sensor merely indicates as whether fuel in the fuel tank exceeds the prescribed level or not, and more specifically, such a fuel sensor does not provide a continuous visual information on the decreasing in an amount of fuel, unlike the float type fuel gauge. As a result, information that the fuel is decreased to an amount less than the prescribed amount is suddenly given, thus causing unfavorable results.

SUMMARY OF THE INVENTION

An object of the present invention is to substantially eliminate defects or drawbacks encountered in the prior art mentioned above and to provide a fuel tank unit of a motorcycle, which permits to mount the float type fuel level gauge and the fuel pump through a single (one common) opening.

This and other objects can be achieved according to the present invention by providing a fuel tank unit of a motorcycle in which an air cleaner and a fuel tank unit are disposed above an engine, said fuel tank unit comprising:

a fuel tank body having a front half portion and a rear half portion, the front half portion being provided with a recess portion in which the air cleaner is received, the recess portion being provided on a front side of a bottom of the fuel tank body so as to have an opening opened downward, the rear half portion of the fuel tank body serving as a substantial capacity section;

a fuel pump disposed inside the substantial capacity section; and a fuel level gauge device mounted on a top portion of the fuel pump to detect a fuel level in the fuel tank body, the fuel level gauge including a gauge body disposed above the fuel pump and an arm member pivoted on the gauge body and having a free end swingable above the fuel pump.

In a preferred embodiment, the arm member having, at a free end thereof, a float is pivoted so as to be swingable up and down on a plane which is in parallel with a vertical plane connecting a ground surface and a longitudinal axial line (i.e., a plane including a longitudinal axial line) of the motorcycle in an advancing direction thereof.

The fuel pump is mounted in the fuel tank body so that a longitudinal axis of the fuel pump is inclined with a rear end thereof lifted higher than a front end thereof.

The arm member has a center of a swing motion positioned substantially at a middle portion in a depth direction of the substantial capacity section of the fuel tank body. The arm member has an axial line, which is set to be inclined upward from the center of the swing motion of the arm member at an upper limit position of a measuring range of the fuel gauge body, and the fuel tank body is provided with an upper rear portion having an inclined surface, which is inclined upward so as to be substantially in parallel with the axial line of the arm member at the limit position thereof.

According to the characters and structures of the present invention mentioned above, since the float type fuel level gauge device is provided on a top portion of the fuel pump, and the arm member is pivoted on the gauge body of the fuel level gauge device so that a free end of the arm member is swingable above the fuel pump, it is unnecessary to additionally form any specific opening into which the gauge is to be inserted and eliminate the restriction of mounting place of the fuel pump.

In addition, by connecting swingably the arm member having it free end the float to the gauge body so as to swing up and down on the plane, which is in parallel with the vertical plane connecting the longitudinal line of the motorcycle in the advancing (cruising) direction with the ground surface, the bending moment, which is applied to the swing axis of the arm member, can be reduced, thus improving durability.

In addition, by fixing the fuel pump to the fuel tank so that the longitudinal axis of the fuel pump is inclined with its rear end lifted higher than its front end, it is made possible to increase the measurement range of fuel level.

Further, by positioning the center of the swing motion of the arm member substantially at the middle portion in the depth direction of the substantial (essential) capacity member of the fuel tank, it is also made possible to decrease the length of the arm member.

Furthermore, the position of the arm member, which is swung to the upper limit position of the measuring range of the gauge body, is determined so that the axial line of the arm member is inclined upward from the center of the swing motion thereof. Accordingly, when the arm member is kept in that upper limit position, the inclined surface on the upper plate of the rear portion of the fuel tank is also inclined upward so as to be substantially in parallel with the axial line of the arm member. It is therefore possible to provide an improved riding feeling.

It is to be noted that the nature and further characteristic features of the present invention will be made more clear from the following descriptions made with reference to the accompanying drawings.

DESCRIPTION OF THE PREFERRED EMBODIMENT

Embodiments of the present invention will be described hereunder with reference to the accompanying drawings.

Figure 1:
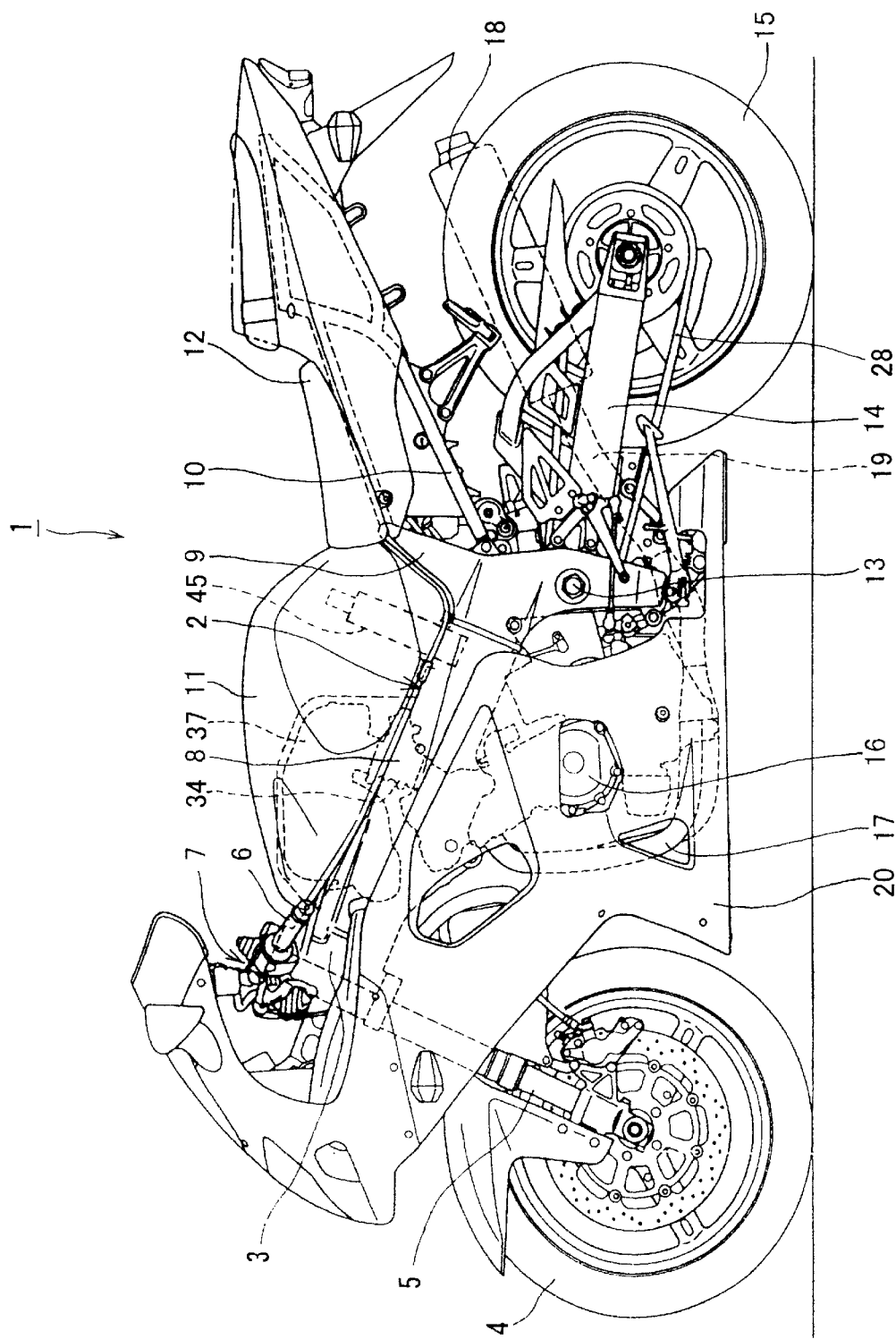
FIG. 1 is a left-hand side view of a motorcycle having a fuel tank unit according to the present invention.

FIG. 1 is a left-hand side view illustrating an example of a motorcycle to which the present invention is applicable. As shown in FIG. 1, the motorcycle 1 is provided with a body frame 2 having the front end to which a head pipe 3 is mounted. The head pipe 3 is provided with a steering mechanism 7, which includes a suspension mechanism, not shown, and is composed of a pair of front forks 5 for rotatably supporting a front wheel 4, a handle bar 6 and the other components. The operation of the handle bar 6 causes the front wheel 4 to be steered in the right-hand or left-hand direction.

The body frame 2 is formed, for example, into a twin-tube type and composed of: a pair of main tubes 8, which extend just on the rear side of the head pipe 3 in the transverse direction of the body frame 2 and then extend obliquely downward and rearward so as to be in parallel with each other, providing substantially a linear shape in the side view; a pair of body frames 9, which are connected integrally with the rear ends of the main tubes 8, respectively, and extend substantially up and down; and a pair of seat frames 10, which extend obliquely upward and rearward from the rear and upper ends of the body frames 9, respectively.

A fuel tank unit having a fuel tank body 11 (which is called merely fuel tank 11 herein) is disposed above the main tubes 8. A driver's seat 12 is disposed above the seat frames 10. A pivot shaft 13 extends between the body frames 9 on the central lower side thereof. A swing arm 14 is pivoted around the pivot shaft 13 so as to be swingable. A rear wheel 15 is rotatably supported on the rear end of the swing arm 14.

A four stroke-cycle parallel-multiple-cylinder engine 16 is mounted on a position of the body frame 2, which is located in a central lower position of the body of the motorcycle and below the fuel tank 11. An exhaust pipe 17 for composing an exhaust system of the engine, which is connected to the front side of the engine 16, passes through below the engine 16 to extend rearward. A muffler 18 is disposed on the one side of the body, i.e., the right-hand side, as viewed, of the rear wheel 15 in the embodiment of the present invention, so as to extend obliquely upward and rearward. The exhaust pipe 17 and the muffler 18 are connected to each other by means of a connection pipe 19.

A streamlined cowling 20 covers at least a part of the body of the motorcycle 1 (i.e., the front portion and the central lower portion in the embodiment of the present invention) so as to reduce air resistance and protect a rider from wind pressure during the running of the motorcycle.

Figure 2:
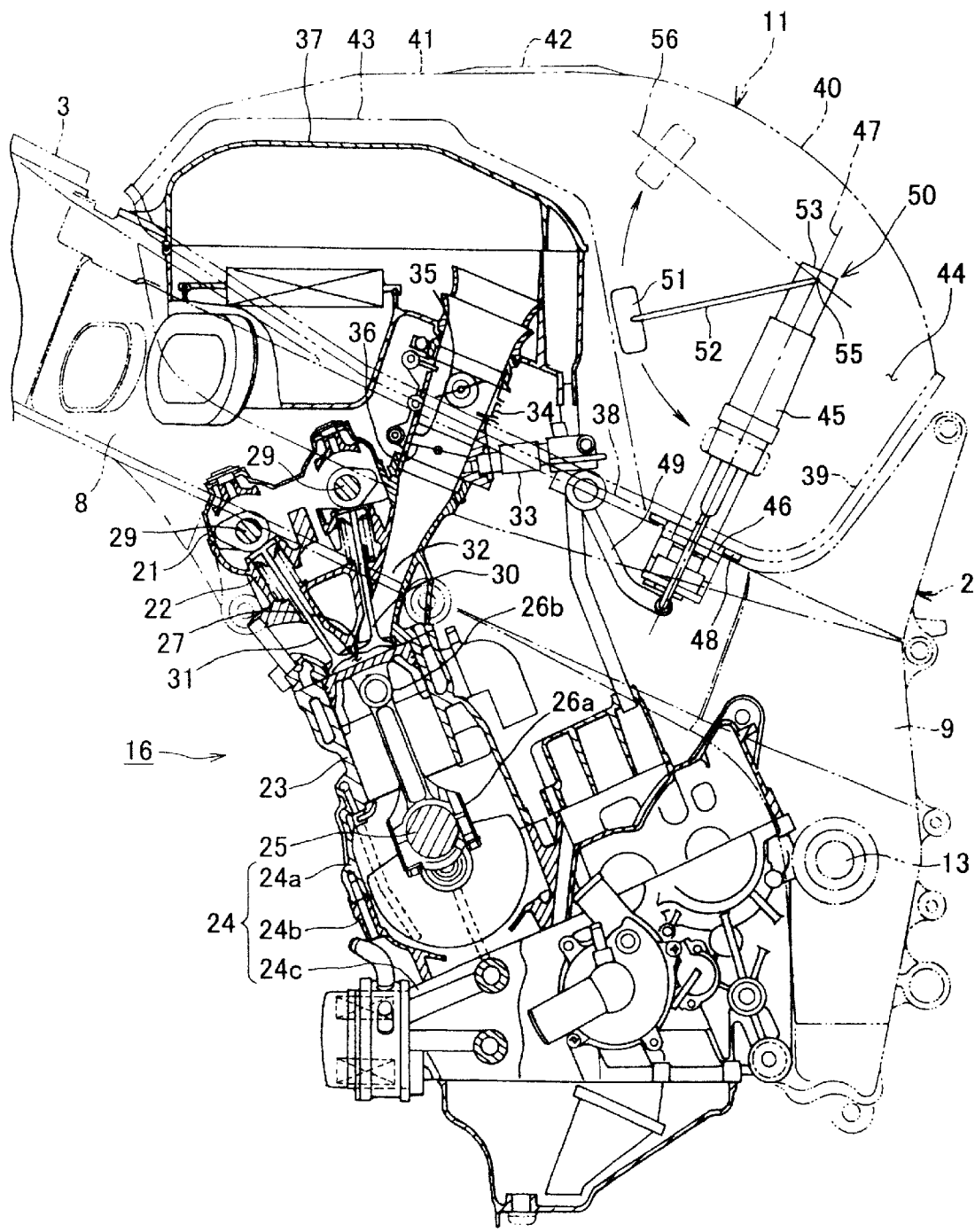
FIG. 2 is a left-hand side view of an engine of the motorcycle.
Figure 3:
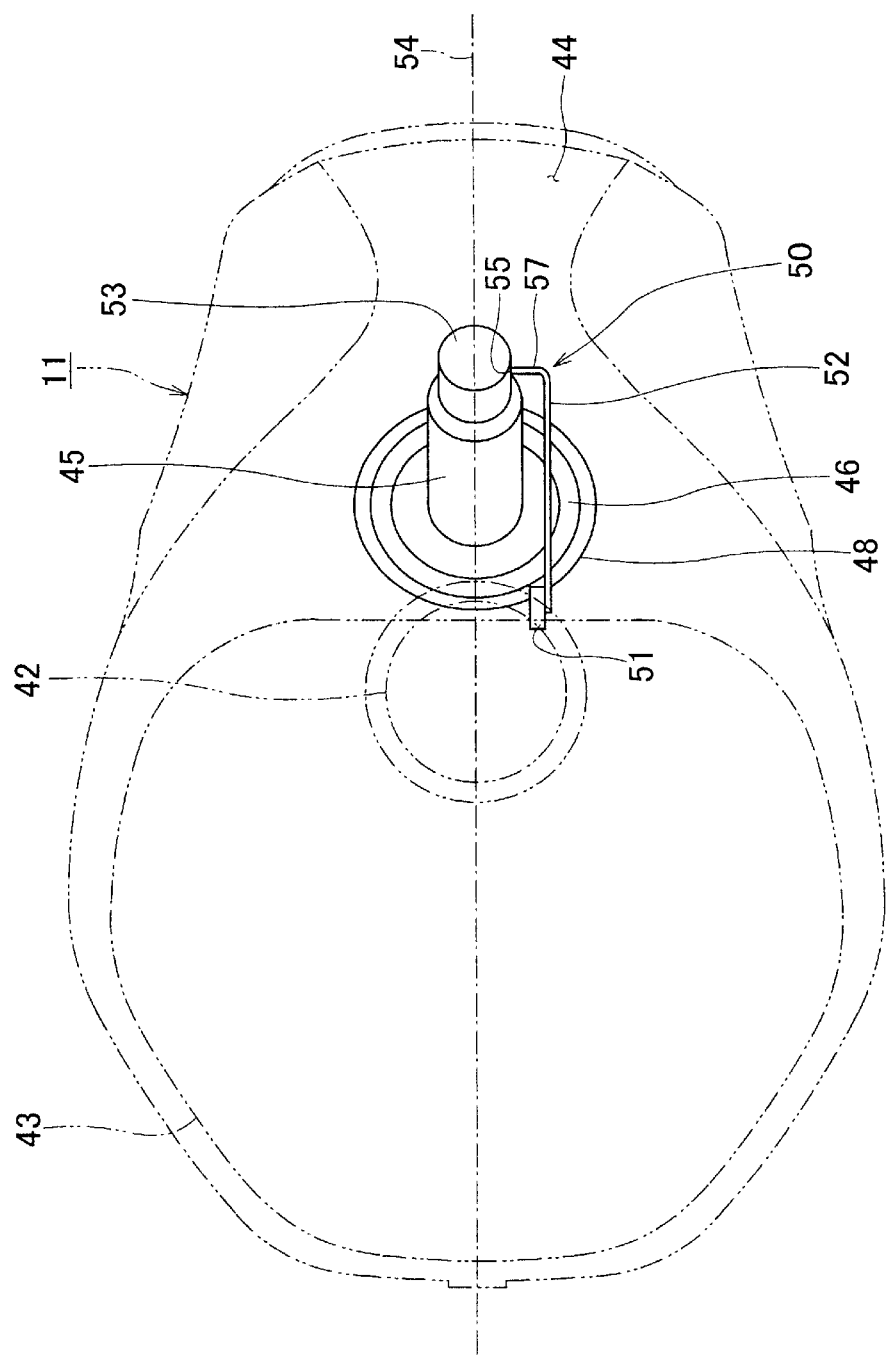
FIG. 3 is a schematic plan view of the fuel tank unit.

With reference to FIGS. 2 and 3, the engine 16 is a four stroke-cycle parallel-multiple-cylinder engine, which provides a contour given mainly by a cylinder head cover 21, a cylinder head 22, a cylinder block 23 and an engine case 24.

The engine case 24 of a dividable structure is divided, for example, into three parts in the vertical direction as shown in FIG. 2, i.e., an upper engine case section 24a, a central engine case section 24b and a lower engine case section 24c. The upper engine case section 24a is integrally formed with the cylinder block 23, which has cylinders arranged in a row coinciding with the transverse direction of the body of motorcycle.

A crankshaft 25 extending in the transverse direction of the engine 16 is rotatably supported on the mating portions of the upper engine case section 24a and the central engine case section 24b. A connecting rod has a large end portion 26a, which is connected to the crankshaft 25. The connecting rod also has a small end portion 26b, which is connected to a piston. The piston is received in the cylinder block 23 so as to be slidable substantially in the vertical direction, as shown in FIG. 2. A combustion chamber 27 is formed in a space between the cylinder head 22 and the piston. An ignition plug, not shown, is screwed into the cylinder head 22 from the outside so as to face the central portion of the combustion chamber 27.

A reciprocating motion of the piston 26 is converted into a rotational motion by means of the crankshaft 25 and then transmitted to the rear wheel 15 serving as the driving wheel, through a not-shown clutch mechanism and transmission mechanism, which are provided in a space defined by the central engine case section 24b and the lower engine case section 24c, as well as a drive chain 28 (see FIG. 1).

The crankshaft 25 is provided, at an end portion thereof, with a cam chain-driving sprocket, not shown. The cam chain-driving sprocket is operatively connected to a cam sprocket, also not shown, which is provided on the end of a camshaft 29 of a valve gear (valve moving mechanism) mounted in the cylinder head 22, through a cam chain, not shown. The transmission of the rotational motion of the crankshaft 25 to the camshaft 29 through the cam chain causes the valve gear to operate so as to carry out an opening or closing operation of suction and exhaust valves 30 and 31. The upper portion of the cylinder head 22 is closed by means of the cylinder head cover 21. The engine 16 is mounted so that the cylinder head cover 21 is placed between the pair of main tubes 8.

A device for supplying air-fuel mixture to the engine used in the motorcycle 1 is of a fuel injection type. A throttle body 34 having a fuel injector 33 is connected to a suction port formed on the cylinder head 22, which communicates with the above-mentioned combustion chamber. The throttle body 34 is provided, in its suction passage 35, with a throttle valve 36. The fuel injector 33 for making a direct fuel injection is provided on the downstream side of the throttle valve 36. The throttle body 34 is disposed on the rear and upper side of the engine 16. An air cleaner 37, which is disposed so as to project upward from the main tubes 8, is connected to the upstream side of the throttle body 34.

The fuel tank unit (fuel tank body 11) disposed above the main tubes 8 has a bottom plate 38, a rear plate 39 and an upper plate 41. The bottom plate 38 is inclined downwardly at its rear end so as to be substantially in parallel with the main tube 8 in the side view of the body of the motorcycle. The rear plate 39 is disposed so as to extend from the rear end of the bottom plate 38 to stand upward, and the upper plate 41 is disposed so as to extend obliquely rearward and upward from the front end of the bottom plate 38 and then extends substantially horizontally, and has an inclined surface 40 inclining upward on the side of the rear portion of the fuel tank 11. A fuel filler opening 42 is formed in the middle of the upper plate 41 of the fuel tank.

The front half portion of the fuel tank 11 has a recess portion 43 in which the air cleaner 37 is receivable. The recess portion 43 is provided on the front side of the bottom plate 38 of the fuel tank 11 so as to be opened downward. The rear half portion of the fuel tank 11 serves as an essential capacity member (substantial capacity section) 44 occupying main portion of the tank body.

The fuel tank unit includes a fuel pump 45 (i.e., an in-tank type fuel pump) disposed in the fuel tank body 11 for forcedly feeding fuel received in the fuel tank 11 to the fuel injector 33. The fuel pump 45 is inserted from an opening 46 formed on the rear portion of the bottom plate 38 of the fuel tank 11, i.e., the bottom of the substantial capacity section 44, towards the inclined surface 40 of the upper plate 41 of the fuel tank so that the longitudinal axis 47 of the fuel pump 45 is inclined with its rear end lifted higher than its front end. The fuel pump 45 is fixed to the fuel tank by closing the opening 46 with a flange 48 integrally provided with the fuel pump 45. The fuel pump 45 and the fuel injector 33 are connected to each other by means of fuel pipe 49.

A float type fuel level gauge device 50 is provided on the top portion of the fuel pump 45. The fuel level gauge device 50 is composed of an arm member 52 having, at its free end, a float 51, and a gauge body 53 for swingably supporting the arm member 52 so as to keep a free end thereof above the fuel pump 45, thereby converting a swing motion of the arm member 52 into an electric signal.

The arm member 52 is swingable up and down on a plane, not shown, which is in parallel with the vertical plane, not shown, connecting the longitudinal line (axial line or a plane including a longitudinal axial line) 54 of the motorcycle in an advancing (running) direction with a ground surface. The free end of the arm member 52 is movable in the advancing direction of the motorcycle. The center 55 of the swing motion of the arm member 52, i.e., the route end thereof is positioned substantially in the middle portion in the depth direction of the substantial capacity section 44 of the fuel tank 11.

The position of the arm member 52, which is swung to the upper limit position of a measuring range of the gauge body 53, is determined so that the axial line 56 of the arm member 52 is inclined upward from the center 55 of swing motion thereof. When the arm member 52 is kept in the above-mentioned upper limit position, the inclined surface 40 on the upper plate 41 of the rear portion of the fuel tank is also inclined upward so as to be substantially in parallel with the axial line 56 of the arm member 52.

Then, the operation of the embodiment of the present invention will be described hereunder.

Provision of the float type fuel level gauge device 50 on the top portion of the fuel pump 45 will eliminate the necessity of formation of any opening through which the gauge device is to be inserted, in addition to the opening for the fuel pump 45.

The free end of the arm member 52 of the fuel level gauge device 50 is swingable above the fuel pump 45. As a result, the float 51 does not interfere with an operation for inserting the fuel pump 45 from the opening 46, which is formed on the rear portion of the bottom plate 38 of the fuel tank 11. It is therefore not necessary to make unnecessarily the diameter of the opening 46 large, thus eliminating the restriction of mounting place of the fuel pump 45.

Vibration caused in the advancing direction of the motorcycle 1 due to the increase or decrease in velocity and vibration caused in the vertical direction thereof due to a bumping action from the ground surface on which the motorcycle 1 is run are larger, in both of vibration intensity and generation frequency, than vibration caused in the transverse direction of the motorcycle 1. In view of these facts, by connecting swingably the arm member 52 having, at its free end, the float 51 to the gauge body 53 so as to swing up and down on the plane, which is in parallel with the vertical plane connecting the longitudinal line 54 of the motorcycle in the advancing direction with the ground surface, the bending moment, which is applied to the swing axis 57 of the arm member 52, can be reduced, thus improving the durability of the motorcycle.

In addition, the fuel pump 45 is inserted from the opening 46 formed on the rear portion of the bottom plate 38 of the fuel tank 11 towards the inclined surface 40 of the upper plate 41 of the fuel tank so that the longitudinal axis 47 of the fuel pump 45 is inclined with its rear end lifted higher than its front end and is then fixed to the fuel tank. It is therefore possible to ensure a long distance as set between the center 55 of the swing motion of the arm member 52 provided on the fuel level gauge device 50, which is mounted on the top portion of the fuel pump 45, and the recess portion 43 provided in the front portion of the fuel tank 11 to receive the air cleaner 37. As a result, it is possible to make longer the length of the arm member 52 having, at its front end, the float 51, thus increasing the measurement range of the fuel level.

The center 55 of the swing motion of the arm member 52 is positioned substantially at the middle portion in the depth direction of the substantial capacity section 44 of the fuel tank 11. Consequently, even if the measurable range of the fuel level gauge device 50 is decreased, it is possible to decrease the length of the arm member 32.

The position of the arm member 52, which is swung to the upper limit position of the measuring range of the gauge body 53, is determined so that the axial line 56 of the arm member 52 is inclinded upward from the center 55 of the swing motion thereof. When the arm member 52 is kept in the above-mentioned upper limit position, the inclined surface 40 on the upper plate 41 of the rear portion of the fuel tank 41 is also inclined upward so as to be substantially in parallel with the axial line 56 of the arm member 52. It is therefore possible to provide a shape of the rear position of the fuel tank 11, which fits with a riding posture of a rider.

It is to be noted that the present invention is not limited to the described embodiment and many other changes and modifications may be made without departing from the scope of the appended claims.

What is claimed is:

1. A fuel tank unit of a motorcycle in which an air cleaner and the fuel tank unit are disposed above an engine, said fuel tank unit comprising:

a fuel tank body having a front half portion and a rear half portion, said front half portion being provided with a recess portion in which said air cleaner is received, said recess portion being provided on a front side of a bottom of the fuel tank body so as to have an opening opened downward, said rear half portion of the fuel tank body serving as a substantial capacity section;

a fuel pump disposed inside the substantial capacity section of the fuel tank body; and a fuel level gauge device mounted on a top portion of the fuel pump to detect a fuel level in the fuel tank body, said fuel level gauge including a gauge body disposed above the fuel pump and an arm member pivoted on the gauge body and having a free end swingable above the fuel pump, said arm member having, at a free end thereof, a float and being pivotable so as to be swingable up and down on a plane which is in parallel with a vertical plane connecting a ground surface and a longitudinal axial line of the motorcycle in an advancing direction thereof.

2. A fuel tank unit of a motorcycle in which an air cleaner and the fuel tank unit are disposed above an engine, said fuel tank unit comprising:

a fuel tank body having a front half portion and a rear half portion, said front half portion being provided with a recess portion in which said air cleaner is received, said recess portion being provided on a front side of a bottom of the fuel tank body so as to have an opening opened downward, said rear half portion of the fuel tank body serving as a substantial capacity section;

a fuel pump disposed inside the substantial capacity section of the fuel tank body; and a fuel level gauge device mounted on a top portion of the fuel pump to detect a fuel level in the fuel tank body, said fuel level gauge including a gauge body disposed above the fuel pump and an arm member pivoted on the gauge body and having a free end swingable above the fuel pump, said arm member having an axial line, which is set to be inclined upward from the center of the swing motion of the arm member at an upper limit position of a measuring range of the fuel gauge body, and said fuel tank body having an upper rear portion including an inclined surface, which is inclined upward so as to be substantially in parallel with the axial line of the arm member at said limit position thereof.

3. A fuel tank unit of a motorcycle in which an air cleaner and the fuel tank unit are disposed above an engine, said fuel tank unit comprising:

a fuel tank body having a front half portion and a rear half portion, said front half portion being provided with a recess portion in which said air cleaner is received, said recess portion being provided on a front side of a bottom of the fuel tank body so as to have an opening opened downward, said rear half portion of the fuel tank body serving as a substantial capacity section;

a fuel pump disposed inside the substantial capacity section of the fuel tank body; and a fuel level gauge device mounted on a top portion of the fuel pump to detect a fuel level in the fuel tank body, said fuel level gauge including a gauge body disposed above the fuel pump and an arm member pivoted on the gauge body and having a free end swingable above the fuel pump, said fuel pump mounted on an axial line in an advancing direction of the motorcycle and in said fuel tank body so that a longitudinal axis of the fuel pump is inclined with a rear end thereof lifted higher than a front end thereof, and said fuel level gauge device is provided for a fuel filler opening on a rear side portion of the motorcycle.

\* \* \* \* \*